United States Patent
Zimmer et al.

(10) Patent No.: US 12,255,365 B2
(45) Date of Patent: Mar. 18, 2025

(54) DEVICE AND COMPUTER-IMPLEMENTED METHOD FOR DETERMINING A STATE OF A FUEL CELL SYSTEM

(71) Applicant: Robert Bosch GmbH, Stuttgart (DE)

(72) Inventors: Christoph Zimmer, Korntal (DE);
Jochen Braun, Heimsheim (DE);
Sebastian Gerwinn, Leonberg (DE);
Sriganesh Sriram, Stuttgart (DE);
Volker Imhof, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 579 days.

(21) Appl. No.: 17/489,209

(22) Filed: Sep. 29, 2021

(65) Prior Publication Data

US 2022/0109170 A1 Apr. 7, 2022

(30) Foreign Application Priority Data

Oct. 7, 2020 (DE) ...................... 10 2020 212 654.2

(51) Int. Cl.
*H01M 8/04298* (2016.01)
*H01M 8/04537* (2016.01)

(52) U.S. Cl.
CPC ... *H01M 8/04305* (2013.01); *H01M 8/04552* (2013.01); *H01M 8/04559* (2013.01)

(58) Field of Classification Search
CPC .................................................. H01M 8/04305
See application file for complete search history.

(56) References Cited

U.S. PATENT DOCUMENTS

| | | | | |
|---|---|---|---|---|
| 8,332,342 B1* | 12/2012 | Saha | ................... | G01R 31/392 706/45 |
| 2004/0101724 A1* | 5/2004 | Imamura | ............. | H01M 8/2457 429/432 |
| 2005/0214600 A1* | 9/2005 | Ikezoe | ................. | H01M 8/241 429/432 |
| 2013/0275065 A1* | 10/2013 | Rathmann | .......... | G01R 31/3835 702/61 |
| 2013/0297237 A1* | 11/2013 | Ramos | ................... | G01R 31/52 702/58 |

OTHER PUBLICATIONS

Karnik, A. Y. et al., "Control Analysis of an Ejector Based Fuel Cell Anode Recirculation System," Proceedings of the 2006 American Control Conference, Jun. 2006, pp. 484-489 (6 pages).

(Continued)

*Primary Examiner* — Hyun D Park
(74) *Attorney, Agent, or Firm* — Maginot, Moore & Beck LLP (57) ABSTRACT

A device and method are disclosed for operating a fuel cell system having a fuel cell stack. Data are provided that map input variables of the fuel cell system and a position of a cell of the fuel cell stack on a voltage of the cell. A model is trained to map the input variables of the fuel cell system and the position of a cell of the fuel cell stack on a probability distribution for a prediction of a voltage of the cell. Instantaneous input variables of the fuel cell system are determined. A probability for the voltage of the cell or for a total voltage of the fuel cell stack is determined for a cell of the fuel cell stack based on the input variables using the model based on the probability distribution. A state of the fuel cell system is determined based on the probability.

18 Claims, 3 Drawing Sheets

(56) References Cited

OTHER PUBLICATIONS

Zirkel; D., "Flachheitsbasierter Entwurf von Mehrgrößenregelungen am Beispiel eines Brennstoffzellensystems," 2010 (161 pages).
Niemeyer, J., "Modellprädiktive Regelung eines PEM-Brennstoffzellensystems," 2008 (210 pages).
Hähnel, C., "Regelung zum effizienten Betrieb eines PEM-Brennstoffzellensystems, " Helmut Schmidt Universität, 2017 (158 pages).
Michael A. Danzer et al., Model-based control of cathode pressure and oxygen excess ratio of a PEM fuel cell system, Journal of Power Sources, Aug. 25, 2007, pp. 515-522, Germany.
Amey Y. Karnik et al., Humidity and Pressure Regulation in a PEM Fuel Cell Using a Gain-Scheduled Static Feedback Controller, IEEE Transactions on Control Systems Technology, Mar. 2009, pp. 283-297, vol. 17, No. 2.
Amey Y. Karnik et al., Modeling and Control of an Ejector Based Anode Recirculation System for Fuel Cells, Third International Conference on Fuel Cell Science, Engineering and Technology, May 23-25, 2005, pp. 721-725, Ypsilanti, Michigan.

* cited by examiner

DEVICE AND COMPUTER-IMPLEMENTED METHOD FOR DETERMINING A STATE OF A FUEL CELL SYSTEM

This application claims priority under 35 U.S.C. § 119 to application no. DE 10 2020 212 654.2, filed on Oct. 7, 2020 in Germany, the disclosure of which is incorporated herein by reference in its entirety.

TECHNICAL FIELD

The disclosure relates to a device and a computer-implemented method for determining a state of a fuel cell system.

BACKGROUND

A fuel cell system represents an overall system which comprises a plurality of subsystems. The fuel cell system comprises one or multiple fuel cell stacks and multiple subsystems, which have to be provided to supply the fuel cell stack or the fuel cell stacks.

The fuel cell stack generally does not have a single actuator, i.e., taken as such it is solely a passive component or a passive assembly.

To monitor a state of the fuel cell stack, sensors can be installed which monitor variables of the fuel cell stack, for example, the cell voltages. These sensors are costly and moreover have to be secured against failure or incorrect measurements.

SUMMARY

A computer-implemented method for determining a state of a fuel cell system which comprises a fuel cell stack provides that data are provided, which each map input variables of the fuel cell system and a position of a cell of the fuel cell stack on a voltage of the cell, wherein a model is trained in dependence on the data to map the input variables of the fuel cell system and the position of a cell of the fuel cell stack on a probability distribution for a prediction of a voltage of the cell, wherein instantaneous input variables of the fuel cell system are determined, wherein at least one probability for the voltage of the cell and/or for a total voltage of the fuel cell stack is determined for at least one cell of the fuel cell stack in dependence on the instantaneous input variables using the model in dependence on the probability distribution, wherein a state of the fuel cell system is determined in dependence on the probability. This enables individual cell monitoring, operating strategy monitoring, and a diagnosis without, in operation of the fuel cell system after a training, all sensors which were used in the training of the model being required.

In one aspect, the state characterizes a safety of input variables for the voltage of the at least one cell and/or for a total voltage of the fuel cell stack, wherein a probability is determined in dependence on the probability distribution, wherein an operation of the fuel cell system is classified as safe if the probability meets a condition. Safety-relevant aspects are thus recognizable.

It can be provided that a probability is determined that the voltage of the at least one cell is less than a first threshold value or that the voltage of the at least one cell is greater than a second threshold value or that the total voltage of the fuel cell stack is greater than a third threshold value. Safety-relevant overshoots or undershoots of voltages in operation are thus avoidable.

In the training, at least one expected value and a variance for the probability distribution may be determined in dependence on the data. A target function, in particular a likelihood function, can thus be prepared which quantifies how well the parameterized model describes the data. The parameterized model is, for example, a Gaussian process model. An optimization of the target function parameterizes the Gaussian process model.

It can be provided that a value for the probability for the voltage of the cell is determined from the probability distribution, wherein it is checked whether or not the value meets the condition. An individual cell is thus effectively monitored.

It can be provided that a value for the probability is determined for each of a plurality of cells of the fuel cell stack, wherein a shared probability for the plurality of cells is determined using the values, and wherein it is checked whether or not the shared probability meets the condition. The total voltage is thus effectively monitored in dependence on the probabilities for the individual cells.

It can be provided that a solution for an optimization problem is determined which is defined in dependence on a shared probability for a plurality of cells of the fuel cell stack and in dependence on a function, wherein the solution defines at least one activation variable or at least one parameter for operating the fuel cell system. A reliable operation of the fuel cell system is thus ensured depending on the situation.

The function can be defined in dependence on a difference between a minimum and a maximum voltage of the cells.

The function can be defined in dependence on a variance of the voltages of the cells.

In one aspect, a position of a cell and/or a cell of the fuel cell stack can be determined in dependence on the model, which either has a higher probability than another cell of the fuel cell stack of being in a safe operating state or has a lower probability of being in a safe operating state. Possible differences between the voltages of cells relevant for the operating strategy can thus be recognized and subsequently avoided.

A first probability distribution for a real part and a second probability distribution for an imaginary part of an impedance of the cell and/or the fuel cell stack can be determined, wherein a state of the fuel cell system is determined in dependence on the first probability distribution and the second probability distribution. This enables more detailed monitoring.

An impedance measurement supplies a real part and an imaginary part of an impedance as a result upon provided voltage. The impedance supplies additional characteristic variables. For example, a moisture content of the membrane may be approximately inferred from the impedance.

It thus becomes even better possible to operate the fuel cell system without continuous cell voltage monitoring (CVM) and without a CVM sensor system adapted for this purpose. The data from the impedance measurement can additionally be used in a machine learning method to assist with dispensing with the CVM sensor system. An informative value of the model is thus significantly improved.

In one aspect, a first measurement on the fuel cell system can be acquired for the training, wherein a first measure of an information content, in particular a first entropy, is determined for the first measurement. In this aspect, a second measurement can be acquired on the fuel cell system, wherein a second measure for an information content, in particular a second entropy, is determined for the second measurement. It can be provided that either the data from the first measurement are provided, if the first measure is greater than the second measure, or otherwise the data from the second measurement are provided. The training is thus executed faster.

It can be provided that data are provided for the training which are restricted by at least one barrier, in particular for a minimum permitted voltage or a maximum permitted voltage of the cell. The model thus learns probability distributions which take into consideration the minimum permitted voltage or the maximum permitted voltage of the cell in operation. This further improves the monitoring.

A device for determining a state of a fuel cell system provides that the device is designed to execute the method.

BRIEF DESCRIPTION OF THE DRAWINGS

Further advantageous embodiments result from the following description and the drawings. In the figures of the drawings.

DETAILED DESCRIPTION

Figure 2:
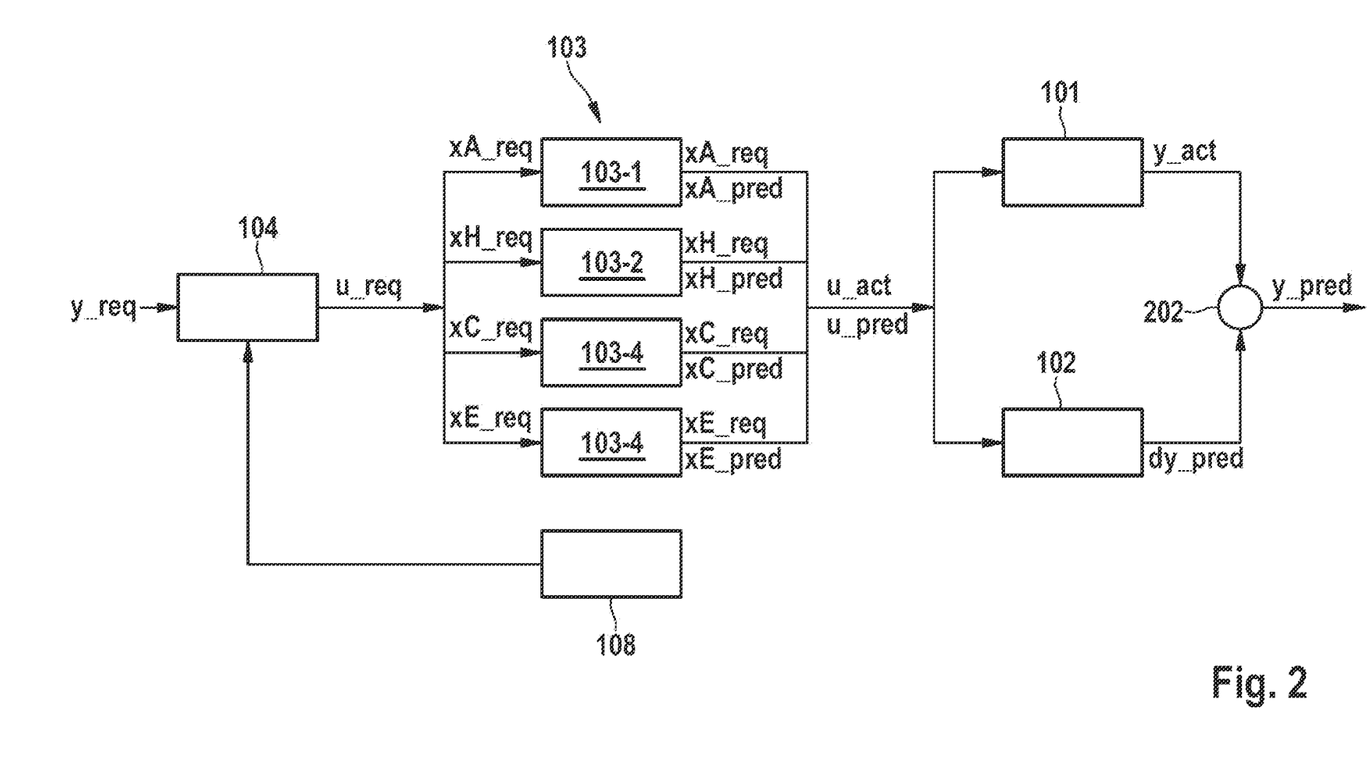
FIG. 2 shows a schematic illustration of an interaction of models for the operation of the fuel cell system.

The structure described hereinafter, in particular of FIG. 2, is set forth as an example to explain the method described hereinafter. The method is accordingly applicable to other model structures and controller structures.

Figure 1:
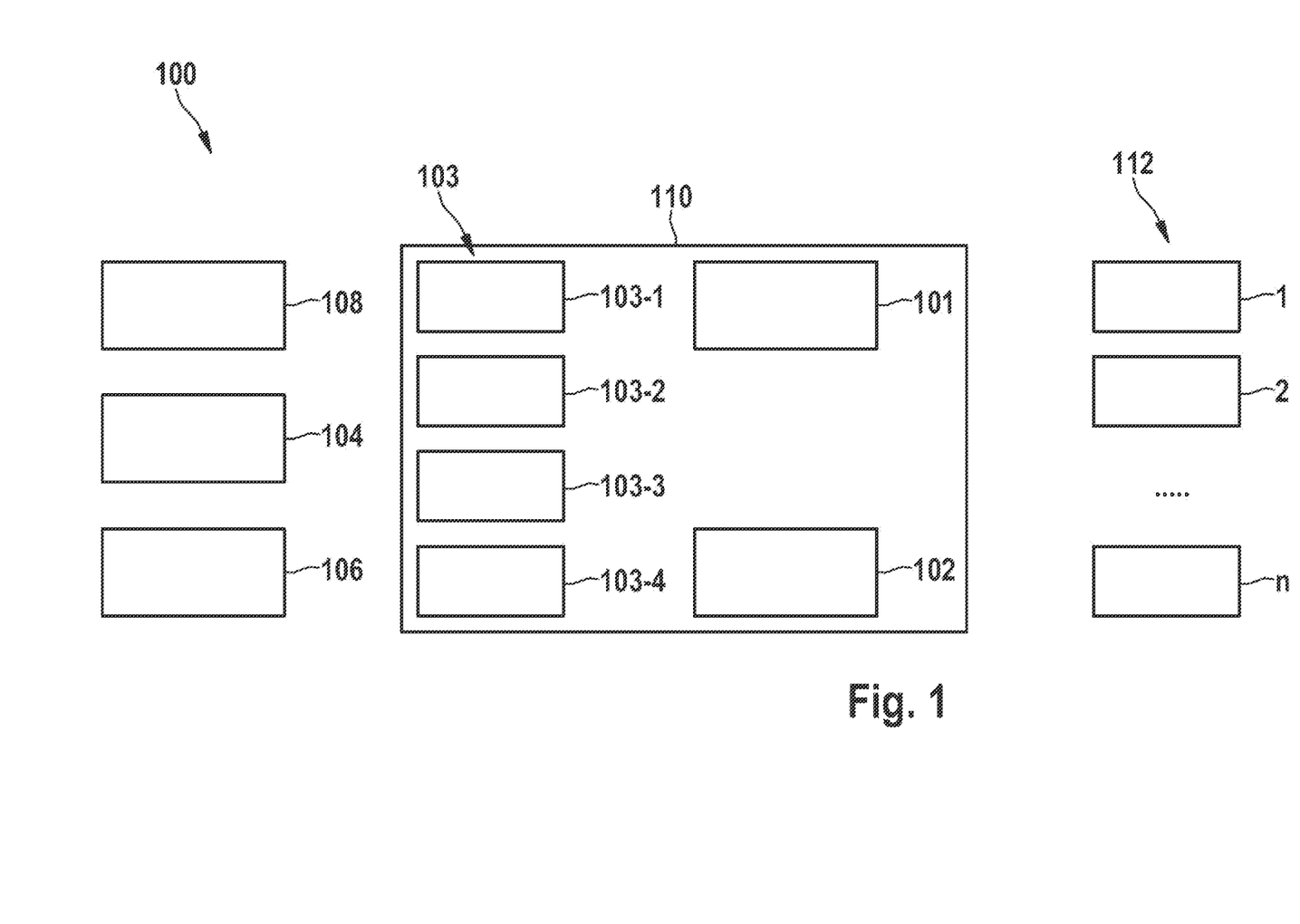
FIG. 1 shows a schematic illustration of a device for operating a fuel cell system.

FIG. 1 schematically shows a device 100 for determining a state of a fuel cell system having a fuel cell stack. The device 100 is designed to execute a method described hereinafter. The device 100 comprises a forward model, which is designed to determine an electrical power and a voltage as a function of control variables. For example, the forward model comprises a first model 101, a second model 102, and at least one third model 103. The fuel cell system comprises a fuel cell stack and supplying systems. The fuel cell system forms an overall system which is at least partially modelled using the at least one third model 103 in the example. The at least one third model 103 in the example is also a chemical or physical model, described in particular by differential equations.

The following four third models 103 are shown in the example:

A model 103-1 for a part of the overall system which is used for supplying and/or exhausting air.

A model 103-2 for a part of the overall system which is used for metering hydrogen from a tank system, exhausting the purge gas from the anode path, draining the anode path, and circulating hydrogen in the fuel cell system.

A model 103-3 for a part of the overall system which is used for cooling the fuel cell system.

A model 103-4 for an electrical part of the overall system which transfers the electric power of the fuel cell stack into a vehicle electrical system or another electrical network, for example, by means of a DC/DC converter and further components, e.g., a device for short-circuit, current measurement, voltage measurement of the fuel cell stack and/or of cell packets and/or individual cells of the fuel cell stack.

The first model 101 is designed as a physical model which describes physical relationships in the fuel cell system, for example, by means of differential equations.

The second model 102 is designed as a data-based model, which models a difference model between the physical model and the actual behaviour of the fuel cell system.

Up to this point, accurate dynamic models which describe the behaviour of the overall fuel cell system have not existed. Although individual parts of the overall system can be described well using the at least one third model 103, the dynamic interplay of these parts in the overall system is unknown or is only slightly known.

The forward model enables, at a time t, a prediction, for example, of the electric power of the fuel cell system at a next time t+1 in dependence on possible activation variables at the time t and within a short prior timeframe T.

This modelling is based on a hybrid model which has a chemical and/or physical component and a data-based component. The chemical and physical component consists of already known parts of the overall system, for which the first model 101 and the at least one third model 103 are defined in the form of differential equations. Examples of the differential equations used, which describe the dynamic behaviour of the individual parts of the overall system, in the example the air system, the cooling system, the hydrogen system, and the electrical system, are known, for example from:

[1] Control Analysis of an Ejector Based Fuel Cell Anode Recirculation System, Amey Y. Karnik, Jing Sun and Julia H. Buckland.

[2] Model-based control of cathode pressure and oxygen excess ratio of a PEM fuel cell system, Michael A. Danzer, Jorg Wilhelm, Harald Aschemann, Eberhard P. Hofer.

[3] Humidity and Pressure Regulation in a PEM Fuel Cell Using a Gain-Scheduled Static Feedback Controller, Amey Y. Karnik, Jing Sun, Fellow, IEEE, Anna G. Stefanopoulou, and Julia H. Buckland.

[4] MODELING AND CONTROL OF AN EJECTOR BASED ANODE RECIRCULATION SYSTEM FOR FUEL CELLS, Amey Y. Karnik, Jing Sun.

[5] Flachheitsbasierter Entwurf von Mehrgrößenregelungen am Beispiel eines Brennstoffzellensystems [Area-based design of multivariable controllers on the basis of the example of a fuel cell system], Daniel Zirkel.

[6] Modellprädiktive Regelung eines PEM-Brennstoffzellensystems [Model-predictive control of a PEM fuel cell system], Jens Niemeyer.

[7] Regelung zum effizienten Betrieb eines PEM-Brennstoffzellensystems [Controller for efficient operation of a PEM fuel cell system], Christian Hähnel All of these parts of the overall system have individual manipulated variables which influence their dynamic response. In the following, the manipulated variables of fuel cell systems and their description are set forth for exemplary parts of the overall system, using which the dynamic response can be influenced, or by which the dynamic response is influenced. These variables are additionally also essential for the degradation or aging of the individual components, in particular of the fuel cell stack, and for the energy consumption or power requirement of the systems supplying the fuel cell stack, in particular due to parasitic losses. For example, an air compressor of the fuel cell system alone can consume 15% of the fuel cell stack power. The fuel cell stack has to supply this power more in gross so that it can emit a desired net power as useful power.

1) Air System lambda_cath: air excess in relation to stoichiometry in the cathode path of the fuel cell system.

mAir_cath: air mass flow in the cathode path of the fuel cell system.

p_cath: pressure in the cathode path of the fuel cell system.

T_cath: temperature in the cathode path of the fuel cell system.

fi_cath: humidity in the cathode path of the fuel cell system.

This part of the fuel cell system is used for supplying and/or exhausting air for the fuel cell stack.

The variables lambda_cath and mAir_cath are usable alternatively to one another in the example. The use of the humidity can be provided if the fuel cell system can set the humidity of supply air.

2) Hydrogen System lambda_anod: hydrogen molecule excess, i.e., H2 excess in relation to stoichiometry in the anode path of the fuel cell system.

mH2_anod: hydrogen molecule mass flow, i.e., H2 mass flow, in the anode path of the fuel cell system.

p_anod: pressure in the anode path of the fuel cell system.

dp_anod_cath: differential pressure between cathode path and anode path in the fuel cell system.

mN2_anod: nitrogen mass flow, concentration, or a nitrogen molecule flow in the anode.

mH2_addfromtank: H2 mass or H2 mass flow which is metered from an H2 tank of the fuel cell system or from outside into the anode path.

Purge_actuation: activation for discharge or removal of anode gas from the anode path.

Drain_actuation: activation for discharge or removal of liquid water from the anode path.

Purge&Drain_actuation: combined activation of the valves or a shared valve for Purge_actuation and Drain_actuation.

This part of the fuel cell system is used for the circulation of hydrogen and further functions for the fuel cell system.

The variables lambda_anod and mH2_anod are usable alternatively to one another in the example. For example, a recirculation rate of a hydrogen recirculation fan relates to mH2_anod, if this fan is present in the fuel cell system.

The variable mH2_addfromtank can additionally comprise a temperature specification. The variable mH2_addfromtank can be used in addition to lambda_anod or mH2_anod or combined with them.

The variable mN2_anod can be derived from a model calculation or ascertained by a sensor. The variable mN2_anod can be used to trigger a purge action.

The variable Purge_actuation can specify in a chronologically discrete manner, like an interval, an opening duration and/or an opening interval of a valve for the discharge or the removal of anode gas. Both can be variable.

The variable Drain_actuation can specify in a chronologically discrete manner, like an interval, an opening duration and/or an opening interval of a valve for the discharge or the removal of liquid water. Both can be variable.

3) Cooling System

T_Stack_op: operating temperature of coolant for the fuel cell system, i.e., approximately an operating temperature of the fuel cell stack.

Fan_actuation: activation of a fan dT_Stack: temperature change of the coolant, for example heating, via the fuel cell stack or temperature change of the fuel cell system.

m_Cool: coolant mass flow through a cooling path of the fuel cell stack or the fuel cell system.

dp_Cool: pressure drop over the cooling path of the fuel cell stack or the fuel cell system.

Pump_actuation: pump activation to generate the coolant mass flow

Valve_actuation: valve activation to generate the coolant mass flow p_Cool: pressure in the coolant path of the stack.

This part of the fuel cell system is used for circulating coolant in the fuel cell system.

The variable T_Stack_op can also be used in an expanded or more accurate manner for a membrane which represents a temperature-critical component of the fuel cell stack. For this purpose, for example, the membrane temperature can be concluded by means of a model from the coolant temperature, the stack exhaust air temperature, the stack voltage, and the stack current. The operating temperature can be modeled in dependence on a load, an ambient temperature, and the activation of the fan, i.e., in dependence on Fan_actuation.

The variable dT_Stack can be determined in dependence on a temperature difference between an output temperature and input temperature of the coolant and can be set by means of a mass flow of the coolant, for example, using a pump and a three-way valve of the cooling system for the fuel cell stack or the fuel cell system.

Alternatively to the variable p_Cool, a differential pressure to the cathode and/or to the anode can be used.

4) Electrical System voltage:

current:

current density:

electric power:

short-circuit relay, short-circuit devices, and possibly further electrical actuators The electric variables voltage, current, current density, electric power of the fuel cell stack interact strongly with a power network, the architecture of which can differ greatly.

For example, the electric power of the fuel cell stack can be transferred by means of a direct current converter, for example a DC/DC converter, in dependence on a voltage and/or a current from the fuel cell stack to the power network. For example, the DC/DC converter can set the current drawn from the fuel cell stack via a voltage gradient.

A short-circuit relay can be provided which short-circuits the fuel cell stack, i.e., both terminals. This can be used for a cold start, for example, in which temporarily no electric power is emitted to a power network, but rather the electric power is converted into heat.

Variables derived therefrom, for example, a resistance or an efficiency, can also be modelled.

An impedance measurement, for example, an impedance spectroscopy, can also be integrated in an electrical subsystem of the fuel cell system. This can be designed to determine a real part and an imaginary part of an impedance for one cell or multiple cells of the fuel cell stack and output them for the further calculation.

These variables represent variables. Not all possible variables are listed exhaustively. There can be a model-based value and a measured value of each of the variables. Additionally or alternatively to absolute variables, differential variables or differences to reference values can also be used. Only a subset of the possible variables can also be used as parameters for the modelling.

The device 100 comprises an activation unit 104, which is designed to activate the fuel cell system or the subsystems for operating the fuel cell stack using the individual manipulated variables. The device 100 can comprise a measuring unit 106, in particular a sensor for acquiring variables on the fuel cell system. The device comprises at least one processing unit 108 in the example, which is designed to execute steps in a method described hereinafter, and at least one memory 110 for the models. The at least one processing unit 108 can be a local processing unit in a vehicle, a processing unit on a server or in the cloud, or a processing unit in particular distributed onto multiple servers or the vehicle and at least one server.

The fuel cell system comprises the fuel cell stack. The fuel cell stack in the example comprises n cells 112, which are shown schematically in FIG. 1 and numbered in accordance with a position i in the fuel cell stack from i=1, . . . n.

An interaction of the models for the operation of the fuel cell system will be described on the basis of FIG. 2.

In the example, an operating variable y_req to be provided is defined as an input variable for the fuel cell system. This operating variable is preferably an electric power, a voltage, an efficiency, or a waste heat, in particular a thermal power, of the fuel cell system. The fuel cell system is to be activated using at least one activation variable u_req in such a way that the fuel cell actually provides this operating variable. This at least one activation variable u_req represents a target value for the activation of the fuel cell system by the activation unit 104. In the example, the operating variable y_req to be provided is mapped by a strategy for the activation on the at least one activation variable u_req. The strategy can be a mapping of the operating variable y_req to be provided by a predetermined linear or nonlinear function or by a predetermined table on the at least one activation variable u_req.

An activation variable deviating from the target value can result due to dead times, inertias, hystereses, aging effects, or deviations of the actuators from the target value. On the one hand, this can be acquired as the actually set activation variable u_act by a sensor, for example. On the other hand, the at least one set activation variable u_pred can be determined as a prediction using the at least one third model 103. In the example, for at least one part of the fuel cell system, in particular for the fuel cell stack or for at least one of the subsystems for its supply, in dependence on a predetermined activation variable x[subsy]_req for the at least one part of the fuel cell system, a prediction x[subsy]_pred for the at least one set activation variable u_pred of at least the part of the fuel cell system is determined and the at least one set activation variable u_pred is defined in dependence on the prediction x[subsy]_pred. The variables x[subsy]_req are combined in the example in a vector which defines the activation variable u_req. Each of the abovementioned manipulated variables can be used as the variable x[subsy]_req for the respective part of the fuel cell system. If multiple manipulated variables are provided for a part, the variable x[subsy]_req represents a vector which comprises these manipulated variables. Only selected variables are described as examples hereinafter.

In FIG. 2, the variables for the model 103-1, i.e., for the air system, are identified with [subsy]=A, the variables for the model 103-2, i.e., for the hydrogen system with [subsy]=H, the variables for the model 103-3, i.e., for the cooling system with [subsy]=C, and the variables for the model 103-4, i.e., for the electrical system with [subsy]=E.

All or only parts of the actual activation variables can be determined or measured in dependence on the particular predetermined activation variable using the model.

Independently of whether the set activation variable is measured, u_act, or modeled, u_pred, this can be a pressure difference between an anode and a cathode of the fuel cell system, a temperature difference between a first temperature of a coolant upon its entry and a second temperature of the coolant upon its exit from the fuel cell stack, a humidity of air, in particular upon its exit from the fuel cell stack, a pressure of air, hydrogen, and/or coolant, an operating temperature, an air mass flow, a hydrogen molecule mass flow, a cooling medium mass flow, or an electrical characteristic variable, in particular a current, a current density, or a voltage on the fuel cell system. The fuel cell system represents an overall system.

The activation variable defines, for example, a pressure difference between an anode and a cathode of the fuel cell system, a temperature difference between a first temperature of a coolant upon its entry and a second temperature of the coolant upon its exit from the fuel cell stack, a humidity of air in particular upon its exit from the fuel cell stack, the pressure of air, hydrogen, and/or coolant, an operating temperature or air mass flow in a part of the fuel cell system which is used to supply and/or discharge air. The set activation variable can define the hydrogen molecule mass flow in the part of the fuel cell system which is used for the circulation of hydrogen in the fuel cell system. The activation variable can define the cooling medium mass flow of a part of the fuel cell system which is used for cooling the fuel cell system. The set activation variable can define the operating temperature, which is approximately a coolant temperature. The set activation variable can define the electrical characteristic variable of an electrical part of the fuel cell system, for example, a current, a current density, or a voltage of one of the fuel cells or of the fuel cell system.

Preferably, the at least one predetermined activation variable u_req defines the target value for the pressure, the operating temperature, the air mass flow, the hydrogen molecule mass flow, the cooling medium mass flow, or the electrical characteristic variable, in particular the current or the voltage of the fuel cell system. The activation variable xA_req defines in the example at a time t a target value for the pressure or the air mass flow in the part of the overall system which is used to supply and/or discharge air. The activation variable xH_req defines in the example at the time t a target value for the hydrogen molecule mass flow in the part of the overall system which is used for the circulation of hydrogen in the fuel cell system. The activation variable xC_req defines in the example at the time t the target value for the cooling medium mass flow of the part of the overall system which is used for cooling the fuel cell system. The activation variable can also define the operating temperature, which is approximately the coolant temperature. The activation variable xE_req defines in the example at the time t the target value of the electrical characteristic variable of the electrical part of the overall system, for example, the current or the voltage of the fuel cells or the fuel cell system. In the example, the predetermined activation variable u_req is a vector u_req=(xA_req, xH_req, xC_req, xE_req)$^T$. The resulting activation variable is accordingly defined in the example by a vector. For the case that all resulting activation variables are measurable, the resulting activation variable is u_act=(xA_act, xH_act, xC_act, xE_act)$^T$. For the case that all resulting activation variables are modelled, the resulting activation variable is u_pred=(xA_pred, xH_pred, xC_pred, xE_pred)$^T$. Mixed forms are preferably used, in which the resulting activation variables measurable using sensors available in any case on the fuel cell system are measured and the others are modelled.

An operating variable y_act of the fuel cell system is determined by the first model 101 in dependence on the at least one resulting activation variable. In the example, the resulting operating variable is a scalar, but a vector having multiple values of different operating variables can also be determined by the first model 101. The fuel cell model according to Kulikovsky is used in the example for the first model 101 as the stationary model. The model according to Kulikovsky was analytically derived from the underlying differential equation system for describing the electrokinetics of the cathode catalyst layer. This model uses the input variables cathode mass flow, cathode lambda, cathode input pressure, cathode output pressure, ambient humidity at the cathode entry, ambient humidity at the cathode exit, the current or the current density, the coolant entry temperature, and the coolant exit temperature.

A prediction for a deviation dy_pred of the operating variable y_act determined by the first model 101 from an actual value of the operating variable on the fuel cell system is determined by the second model 102 in dependence on the at least one resulting activation variable.

In the example, the second model 102 is the data-based model, which is to predict a deviation dy_pred between the first model 101 and the actually measured behaviour of the fuel cell system by the Gaussian process. In the training, the second model 102 can initially be randomly initialized and trained in iterations.

The second model 102 is already trained in the example.

An operating variable y_pred is determined at a correction unit 202 in dependence on the operating variable y_act determined by the first model 101 and by the prediction for the deviation dy_pred. This means the prediction of the operating variable by the physical model is corrected by the prediction for the deviation using the data-based model.

It is important in principle that a distribution of voltages $u_i$ of individual cells of the fuel cell stack moves in a bandwidth dU. The bandwidth dU is measured via cell voltages. The bandwidth dU results, inter alia, from the media distributions, flow states, aging states. For n cells, the bandwidth is between a maximum voltage $u_{max,j}$=max($u_1$, ..., $u_n$) at a cell j of the n cells and a minimum voltage $u_{min,k}$=min($u_1$, ..., $u_n$) at a cell k of the n cells $$dU = u_{max,j} - u_{min,k}$$

wherein j and k denote different cells.

The bandwidth dU is to be as small as possible in the example. Media refer here, for example, to one or more of the above-described fluids. A voltage $u_{ges}$ of a fuel cell stack having n cells is composed of the voltages $u_i$ of the individual cells:

$$u_{ges} = u_1 + u_2 + \ldots + u_n$$

To protect components of the fuel cell system, in particular to avoid damage to a cell, it can be provided that the voltages $u_i$ of the cells are greater than a minimum threshold $u_{min}$:

$$u_i > u_{min}$$

The minimum threshold $u_{min}$ can be positive, negative, or zero. The computer-implemented method described hereinafter with reference to FIG. 3 for determining a state of a fuel cell system provides that in steps for machine learning, additional sensors are arranged on the fuel cell system. These sensors or not all of these sensors are required after the machine learning to operate the fuel cell system.

Figure 3:
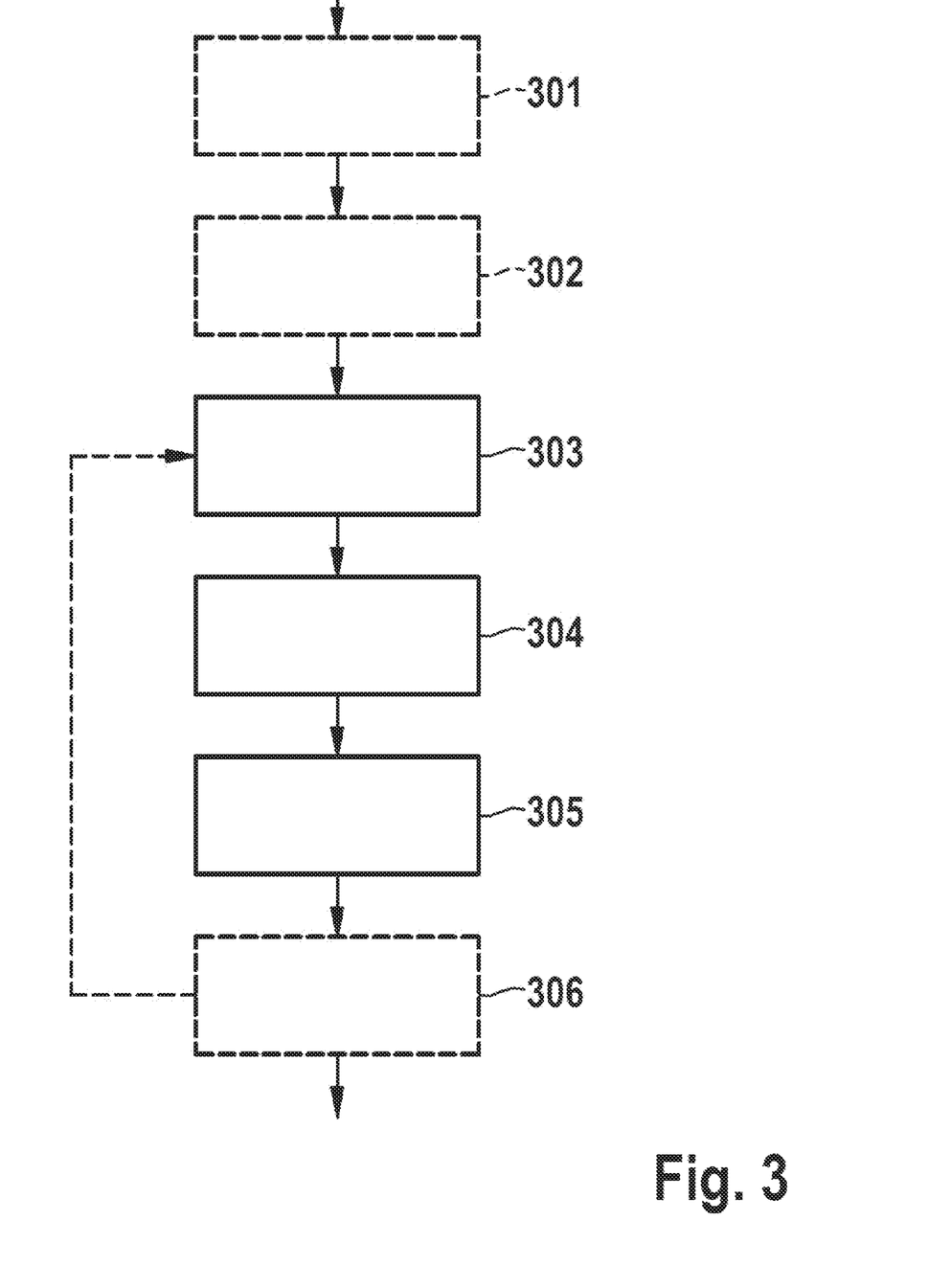
FIG. 3 shows steps in a method for operating the fuel cell system.

Data for tuples of labeled data ($u_{act}$, i, u) for the machine learning can be acquired using the sensors. In this case, $u_{act}$ denotes input variables, i denotes the position of a cell, and u denotes a voltage of the cell. The input variables $u_{act}$ are, for example, current density, air mass flow, air pressure, hydrogen molecule mass flow, temperature of the fuel cell stack. For the case in which all resulting activation variables are measurable, $u_{act}$=u_act=(xA_act, xH_act, xC_act, xE_act)$^T$ can be used. For the case in which all resulting activation variables are modelled, $u_{act}$=u_pred=(xA_pred, xH_pred, xC_pred, xE_pred)$^T$ can be used. Partially using measurable variables and partially using modeled variables for $u_{act}$ can be provided. The data can be acquired in a vehicle fleet or on a test stand. The data can be determined for a variety of different ambient conditions, driving profiles, driving characteristics, or power distributions.

The processing unit 108 is designed to train a model in dependence on the data in the machine learning. The model is trained for the purpose of mapping the input variables $u_{act}$ of the fuel cell system and the position of a cell i of the fuel cell system on a probability distribution for a prediction of a voltage of the cell $u_i$.

In the example, the probability distribution for a cell i is defined by an expected value and a variance. For a Gaussian process, for example, $\mu_u(u_{act}, i)$ and $\sigma_u(u_{act}, i)$ are used.

The model can be used to predict a safety of input variables $u_{act}$. For example, an operation of the fuel cell system is classified as safe if a probability that a voltage $u_i$ of the individual cells is less than a threshold value c meets a condition b. The condition is, for example:

$$P(u_i > c) > b$$

wherein c represents the threshold value for the voltage at a cell i. The condition b and the threshold value c can be predetermined by an expert. The condition b can be fixed at a suitable value or defined as a function which is dependent, for example, on environmental conditions or operating state. The same threshold value c and the same condition b can be used for a plurality of the cells.

Cell-dependent threshold values $c_i$ can also be provided. For example, edge cells, i.e., for example, cell i=1 and i=2 and cell i=n and i=n−1, have the most problems of maintaining their voltages. For example, for n cells, $c_1$, $c_2$, $c_3$, ..., $c_{n-2}$, $c_{n-1}$, $c_n$ threshold values are provided, wherein $c_1$, $c_2$, $c_{n-1}$, $c_n$ are different threshold values than $c_3$, ..., $c_{n-2}$.

The threshold values $c_1$, $c_2$, $c_{n-1}$, $c_n$ can have the same value as one another or different values from one another. The threshold values $c_3$, ..., $c_{n-2}$ can have the same value as one another or different values from one another.

The threshold values $c_3$, ..., $c_{n-2}$ are different in this case from the threshold values $c_1$, $c_2$, $c_{n-1}$, $c_n$.

A bandwidth or variance for the voltage at a cell i can also be provided.

The processing unit 108 is designed, for example, to determine depending on the model a shared probability P that an operation of the fuel cell system is safe. The shared probability P is determined, for example, for n cells as:

$$P(u_1 > c, \ldots, u_n > c)$$

wherein $u_1$, ..., $u_n$ denote the respective input variables $u_{act}$,i of the n cells. For example, the shared probability P is an n-dimensional Gaussian process, i.e., an n-dimensional normal distribution.

The processing unit 108 is designed, for example, to determine a position of a cell i and thus one of the n cells in dependence on the model, which has a higher probability than others of the n cells that the cell is in a safe operating state.

The processing unit 108 is designed, for example, to determine a position of a cell i and thus one of the n cells in dependence on the model, which has a higher probability than others of the n cells or than a threshold value s that the cell is in an unsafe operating state. This threshold value s can be predetermined by an expert. The threshold value s is determined as described in the example for the threshold value c. The value for the threshold value s is fixed in contrast to the determination of the threshold value c for an unsafe operating state in that the voltage $u_i$ of the individual cells is greater than the threshold value s. Cell-dependent threshold values $s_i$ can also be provided.

The probability that a cell is in an unsafe operating state is thus $P(u_i<s)>b$. The condition b can be defined by an expert as described above or can have another value.

It is important that the entire stack, i.e., all cells, are operationally safe. This is the case if each individual cell is operated in the operationally safe range. Moreover, the bandwidth dU of the cell voltages over all cells is to be less than a limiting value.

A bandwidth or variance can also be provided for the bandwidth dU.

The voltage $u_{ges}$ of the fuel cell stack can be used for additional supplementary limiting values.

The impedance values can be used as additional criteria. The impedance values can be used in addition to other variables in a model for calculating the voltages. An alternative for $P(u_i<s)>b$ applying for all individual i is, for example, that P(for all i: $u_i<s)>b$.

A secondary condition is, for example, for a threshold value d for the bandwidth dU $$P(u_{max,j} - u_{min,k} < d) > b$$

In the example, it is checked from the probabilities that the voltages $u_i$ of the individual cells i are greater than the threshold value c whether the shared probability meets the condition b or not. This condition b is defined in the example by a parameter δ that characterizes an acceptable risk. The parameter δ is defined, for example, by an expert. The safe operating state is recognized in this example if the following applies for the shared probability P for the n cells:

$$P(u_1>c, \ldots, u_n>c)>b=1-\delta$$

The processing unit 108 can be designed to determine a solution for an optimization problem which is defined in dependence on the shared probability P for the n cells as:

$$u_{act}^{min} F(u) \text{ so that } P(u_1>c, \ldots, u_n c)>1-\delta$$

F(u) is denoted hereinafter as a quality indicator. The quality indicator F(u) represents a target function and can be defined, for example, as a difference between a minimum and a maximum voltage which drops over the n cells:

$$F(u) = u_{min} - u_{max}$$

The quality indicator F(u) can be defined, for example, as a variance of the voltage:

$$F(u) = \sigma(U)$$

Alternatively, the target function is defined over individual voltages $u_1, \ldots, u_n$ of n cells of the fuel cell stack as:

$$F(u_1, \ldots, u_n) = \det\sigma(u_1, \ldots, u_n)$$

wherein $\sigma(u_1, \ldots, u_n)$ is a predictive n×n covariance matrix for n voltages and det is the determinant Alternatively, instead of the determinant, a maximum eigenvalue can also be used.

$$F(u_1, \ldots, u_n) = \lambda_{[max]}\sigma(u_1, \ldots, u_n)$$

Alternatively, a track of the covariance matrix can be used.

For example, the target function over individual voltages $u_1, \ldots, u_n$ of n cells of the fuel cell stack is defined using expected values $\mu_1, \ldots, \mu_n$ for the individual voltages $u_1, \ldots, u_n$ as:

$$F(u_1, \ldots, u_n) = \mathrm{track}\sigma(\mu_1, \ldots, \mu_n)$$

It is also possible to use a Pareto front for a combination of the alternatives for the solution of the optimization problem.

It can be provided that a real part and an imaginary part of an impedance of one or more cells of the fuel cell stack are evaluated. For example, these can be determined by impedance spectroscopy of one cell or the cells of the fuel cell stack. An impedance value of a cell can be used as an input variable for the model. Individual impedance values of the individual cells of the fuel cell stack can be used as input variables for the model. Defining separate threshold values for real and imaginary parts can be provided.

In one aspect, different models can be learned and/or used for different operating states of the fuel cell system. An operating state can be defined, for example, for an operating start, a normal operation, an operating end, or a cold start.

During an acquisition of the data, it can be provided that measurements are acquired in iterations and data are selected which offer a greater, in particular the maximum amount of information. This accelerates the acquisition since fewer measurements are required for the same quality of training. For a Gaussian process as the model, for example, an entropy can be determined for the measurements and used as a measure of the information with respect to the uncertainty of the model.

Using safety barriers in the training can be provided. The safety barriers can be predetermined, for example, by a physical model or another model from the field of machine learning. For example, the model is or the models are trained using a minimum permitted voltage of the cells to avoid destruction of the cells due to falling below the minimum permitted voltage.

Dynamic effects can be taken into consideration, for example, by a use of a history of input variables. For example, a model having a nonlinear autoregressive exogenous (NARX) structure is used which takes into consideration an input space for the input variables $u_{act}$.

Identifying the data in such a way that critical combinations of the input variables $u_{act}$ are recognizable can be provided. Outputting these combinations after recognition for an inspection by a user can be provided.

Using Bayesian optimization instead of the active learning described up to this point to optimize the quality indicator F(u) can be provided. In this case, complete mapping of input variables on the quality indicator F(u) is not learned, but only an optimum operating point is sought out. The optimum operating point is thus determinable faster by F(u).

Learning a shared model for the machine learning of the state and also for the associated quality indicator F(u) can also be provided. For example, a Gaussian process for multidimensional output variables can be used for this purpose.

It can be provided that the total voltage $u_{ges}$ of the fuel cell stack is available, wherein the voltage $u_i$ of individual cells is not available. In this case, assessing a history of the total voltage $u_{ges}$ of the fuel cell stack or using a deviation of the total voltage $u_{ges}$ of the fuel cell stack from a value predicted by the model for an assessment can be provided.

The method described hereinafter with reference to FIG. 3 can be executed in a vehicle or on a test stand. After a training, the method can be executed in a vehicle, wherein the steps of the method no longer have to be executed for the training.

The method provides in a step 301 that data are provided which comprise a plurality of tuples, which each map input variables $u_{act}$ of the fuel cell system and a position of a cell i of the fuel cell stack on a voltage of the cell u.

In one aspect, the data are provided in iterations. It can be provided that in one iteration a first measurement is acquired on the fuel cell system. It can be provided that for the first measurement, a first measure is determined for an information content, in particular a first entropy. It can be provided that in a second iteration, a second measurement is acquired on the fuel cell system. It can be provided that for the second measurement, a second measure is determined for an information content, in particular a second entropy. It can be provided that either the data from the first measurement are provided if the first measure is greater than the second measure or otherwise the data from the second measurement are provided. The measurement having the most information content is thus selected.

In one aspect, the data are provided in such a way that they are restricted by at least one barrier, in particular the safety barrier, which defines the minimum permitted voltage or a maximum permitted voltage at the cell.

In one aspect, the data are provided in such a way that they enable the use of the bandwidth dU.

In a subsequent step 302, the model is trained in dependence on the data to map the input variables $u_{act}$ of the fuel cell system and the position of a cell i of the fuel cell stack on a probability distribution for a prediction of a voltage of the cell $u_i$.

In the example, an expected value and a variance for the probability distribution are learned in dependence on the data. For a Gaussian process, for example, for a cell i, an expected value $\mu_u(u_{act}, i)$ and a variance $\sigma_u(u_{act}, i)$ of a normal distribution are determined. The trained model represents a probability distribution for multiple cells, in the example the n cells of the fuel cell stack.

The model thus trained can subsequently be used for determining the state of the fuel cell system. For this purpose, steps 301 and 302 no longer have to be executed.

In a step 303, instantaneous input variables $u_{act}$ of the fuel cell system are determined. It can be provided that only a part of the input variables $u_{act}$ are to be used which were used in the training.

In a step 304, a probability is determined for at least one cell i of the fuel cell system in dependence on the instantaneous input variables $u_{act}$ using the model in dependence on the probability distribution.

In one aspect, the probability is determined that the voltage of the at least one cell $u_i$ is less than the threshold value c.

In one aspect, the probability is determined that the voltage of the at least one cell $u_i$ is greater than the threshold value s.

It can be provided that a probability is to be determined for each of a plurality of cells of the fuel cell system, preferably for the n cells, in dependence on the probability distribution.

It can be provided that the shared probability is determined.

In step 305, a state of the fuel cell system is determined in dependence on at least one probability which was determined for a cell i and/or in dependence on the shared probability.

The state can characterize the safety of input variables $u_{act}$ for the voltage of the at least one cell $u_i$.

The state can characterize the safety of input variables $u_{act}$ for the total voltage of the fuel cell system $u_{ges}$.

The operation of the fuel cell system is classified as safe, for example, if the probability and/or the shared probability meets the condition b.

It can be provided that it is to be checked whether the probability P that the voltage of the at least one cell $u_i$ is less than the threshold value c meets the condition b or not.

It can be provided that it is to be checked whether the probability P that the voltage of the at least one cell $u_i$ is greater than the threshold value s meets the condition b or not.

It can be provided that it is to be checked whether the shared probability P meets the condition b or not.

It can be provided that it is to be checked whether the probability P that the bandwidth dU for the voltage is less than the threshold value d meets the condition b or not.

The safe operating state is recognized in the example when the condition of each of the checked conditions is met.

It can be provided that the solution for the optimization problem is to be determined that is defined in dependence on the probability P for the n cells.

In the example, the following optimization problem is used with the threshold value c:

$$u_{act}^{min} F(u) \text{ so that } P(u_i > c, \ldots u_n > c) > 1-\delta$$

The optimization problem can be defined accordingly for the other threshold values. For the threshold value s, for example, the optimization problem is $$u_{act}^{min} F(u) \text{ so that } P(u_1 > s, \ldots, u_n > s) > 1-\delta$$

For the threshold value d, for example, the optimization problem is $$u_{act}^{min} F(u) \text{ so that } P(u_{max,j} - u_{min,k} < d) > 1-\delta$$

It can be provided that the fuel cell system is to be operated in an optional step 306 using at least one activation variable or at least one parameter which is defined by the solution.

Subsequently, step 303 can be executed. The method is thus continued with new instantaneous input variables $u_{act}$.

The method can be executed for a first probability distribution for a real part and a second probability distribution for an imaginary part of the impedance of the cell of the fuel cell system. The state of the fuel cell system is determined in this case in dependence on the first probability distribution and the second probability distribution. For example, the mentioned conditions have to be met for the safe operation of both parts and otherwise the operation is classified as unsafe.

The method can be executed using different models for the different operating states of the fuel cell system.

What is claimed is:

1. A method for determining a state of a fuel cell system having a fuel cell stack, the method being computer-implemented, the method comprising:
   providing data that each map input variables of the fuel cell system and a position of a cell of the fuel cell stack to a voltage of the cell, the voltage of each cell of the fuel cell stack determined using a cell voltage monitoring sensor system operably connected to a processing unit;
   training a model using the processing unit, depending on the provided data, to map the input variables of the fuel cell system and the position of the cell of the fuel cell stack to a probability distribution for a prediction of the voltage of the cell;

determining instantaneous input variables of the fuel cell system, using sensors operably connected to the fuel cell stack, the sensors including an impedance sensor, the instantaneous input variables determined without using the cell voltage monitoring sensor system;

determining, as an output of the trained model, at least one probability for at least one of (i) the voltage of at least one cell of the fuel cell stack, and (ii) a total voltage of the fuel cell stack, based on the instantaneous input variables, which are provided as an input to the trained model;

determining a state of the fuel cell system based on the determined at least one probability using the processing unit and without using the cell voltage monitoring sensor system, the determined state including a safe operating state of the fuel cell system and an unsafe operating state of the fuel cell system; and operating the fuel cell system using the processing unit to supply an electrical system of a vehicle with electrical power from the fuel cell stack for operating the vehicle when the determined state is the operating state.

2. The method according to claim 1, wherein the safe operating state is determined in response to the at least one probability meeting a condition.

3. The method according to claim 1, the determining the at least one probability further comprising:
determining at least one of (i) a first probability that the voltage of the at least one cell is less than a first threshold value, (ii) a second probability that the voltage of the at least one cell is greater than a second threshold value, and (iii) a third probability that the total voltage of the fuel cell stack is greater than a third threshold value.

4. The method according to claim 1 further comprising:
determining, using the processing unit, at least one expected value and a variance for the probability distribution based on the provided data.

5. The method according to claim 4 further comprising:
checking whether a value of the determined at least one probability meets a condition.

6. The method according to claim 4 further comprising:
determining, for each of a plurality of cells of the fuel cell stack, a respective value of the at least one probability;
determining a shared probability for the plurality of cells based on the respective values; and
checking whether the shared probability meets a condition.

7. The method according to claim 1, further comprising:
determining a solution for an optimization problem, which is defined in dependence on a shared probability for a plurality of cells of the fuel cell stack and in dependence on a function,
wherein the solution defines one of (i) at least one activation variable, and (ii) at least one parameter for operating the fuel cell system.

8. The method according to claim 7, wherein the function is defined in dependence on a difference between a minimum voltage of the plurality of cells and a maximum voltage of the plurality of cells.

9. The method according to claim 7, wherein the function is defined in dependence on a variance of the voltages of the plurality of cells.

10. The method according to claim 1 further comprising:
determining a position of a first cell of the fuel cell stack using the model, the first cell having one of (i) a higher probability than another cell of the fuel cell stack of being in the safe operating state, and (ii) a lower probability than another cell of the fuel cell stack of being in the safe operating state.

11. The method according to claim 1 further comprising:
using the trained model to determine a first probability distribution for a real part and a second probability distribution for an imaginary part of an impedance of at least one of (i) the at least one cell and (ii) the fuel cell stack; and
using the processing unit to determine the state of the fuel cell system based on the first probability distribution and the second probability distribution.

12. The method according to claim 1 further comprising:
acquiring a first measurement on the fuel cell system;
determining a first measure of an information content for the first measurement;
acquiring a second measurement on the fuel cell system;
determining a second measure of an information content for the second measurement;
providing data from the first measurement in response to the first measure being greater than the second measure; and
providing data from the second measurement in response to the first measure not being greater than the second measure.

13. The method according to claim 12, wherein the first measure is a first entropy and the second measure is a second entropy.

14. The method according to claim 1, the providing the data further comprising:
providing the data which are restricted by at least one barrier.

15. The method according to claim 14, wherein the at least one barrier is one of (i) a minimum permitted voltage and (ii) a maximum permitted voltage of the cell.

16. The method according to claim 1, wherein the instantaneous input variables correspond to an impedance measurement of the cells of the fuel cell stack, such that the input to the trained model includes the impedance measurement.

17. A device for determining a state of a fuel cell system having a fuel cell stack, the device and the fuel cell system included in a vehicle, and the device comprising:
a processing unit configured to:
receive data that each map input variables of the fuel cell system and a position of a cell of the fuel cell stack to a voltage of the cell, the voltage of each cell of the fuel cell stack determined using a cell voltage monitoring sensor system operably connected to the processing unit;
train a model, depending on the received data, to map the input variables of the fuel cell system and the position of a cell of the fuel cell stack to a probability distribution for a prediction of the voltage of the cell;
receive instantaneous input variables of the fuel cell system, using sensors operably connected to the fuel cell stack, the sensors including an impedance sensor, the instantaneous input variables determined without using the cell voltage monitoring sensor system;
determine, as an output of the trained model, at least one probability for at least one of (i) the voltage of at least one cell of the fuel cell stack, and (ii) a total voltage of the fuel cell stack, based on the instantaneous input variables, which are provided as an input to the trained model;

determine a state of the fuel cell system based on the determined at least one probability without using the cell voltage monitoring sensor system, the determined state including a safe operating state of the fuel cell system and an unsafe operating state of the fuel cell system; and operate the fuel cell system to supply an electrical system of the vehicle with electrical power from the fuel cell stack for operating the vehicle when the determined state is the operating state.

18. A non-transitory computer readable medium that stores a computer program for operating a device configured to determine a state of a fuel cell system having a fuel cell stack, the device and the fuel cell system included in a vehicle, and the computer program having machine-readable instructions that, upon the execution by a computer, cause the computer to:

provide data that each map input variables of the fuel cell system and a position of a cell of the fuel cell stack to a voltage of the cell, the voltage of each cell of the fuel cell stack determined using a cell voltage monitoring sensor system operably connected to the computer;

train a model, depending on the provided data, to map the input variables of the fuel cell system and the position of a cell of the fuel cell stack to a probability distribution for a prediction of the voltage of the cell;

determine instantaneous input variables of the fuel cell system, using sensors operably connected to the fuel cell stack, the sensors including an impedance sensor, the instantaneous input variables determined without using the cell voltage monitoring sensor system;

determine, as an output of the trained model, at least one probability for at least one of (i) the voltage of at least one cell of the fuel cell stack, and (ii) a total voltage of the fuel cell stack, based on the instantaneous input variables, which are provided as an input to the trained model;

determine a state of the fuel cell system based on the determined at least one probability using the computer and without using the cell voltage monitoring sensor system, the determined state including a safe operating state of the fuel cell system and an unsafe operating state of the fuel cell system; and operate the fuel cell system to supply an electrical system of the vehicle with electrical power from the fuel cell stack for operating the vehicle when the determined state is the safe operating state.

* * * * *